United States Patent [19]

Suzuki et al.

[11] Patent Number: 5,640,769

[45] Date of Patent: Jun. 24, 1997

[54] METHOD FOR PRODUCING A CAGE OF THE BALL BEARING

[75] Inventors: Akira Suzuki, Kanagawa; Jiami Pu, Tokyo; Magozou Hamamoto, Kanagawa; Kazuo Akagami, Kanagawa; Michiharu Naka, Kanagawa; Masahiro Takahashi, Kanagawa; Mamoru Aoki, Kanagawa; Hiroyuki Ito, Kanagawa; Masao Yamamoto, Kanagawa; Emiko Shiraishi, Kanagawa, all of Japan

[73] Assignee: NSK Ltd, Tokyo, Japan

[21] Appl. No.: 367,424

[22] Filed: Dec. 30, 1994

Related U.S. Application Data

[62] Division of Ser. No. 174,041, Dec. 28, 1993, Pat. No. 5,401,105.

[30] Foreign Application Priority Data

Dec. 28, 1992 [JP] Japan .................................. 4-358511
Oct. 20, 1993 [JP] Japan .................................. 5-262427
Oct. 20, 1993 [JP] Japan .................................. 5-262652

[51] Int. Cl.⁶ .............................. F16C 33/66; F16C 33/58
[52] U.S. Cl. .................. 29/898.067; 384/470; 384/527; 29/898.1; 508/165; 508/167
[58] Field of Search ............................ 29/898.067, 898.1; 269/328.2, 328.16; 384/470, 462, 527, 523, 572; 252/12.2

[56] References Cited

U.S. PATENT DOCUMENTS

| 3,606,657 | 9/1971 | Horikawa ........................ 29/898.1 |
| 3,808,133 | 4/1974 | Brown ............................... 252/56 R |
| 4,126,362 | 11/1978 | Hamblin et al. ................. 29/898.067 |
| 4,253,714 | 3/1981 | Bhushan ............................ 29/898.1 |
| 4,402,108 | 9/1983 | Panwitz ............................... 16/21 |
| 4,528,079 | 7/1985 | Badger ................................ 29/898.1 |
| 4,534,871 | 8/1985 | Johnson ............................. 252/12 |
| 4,675,141 | 6/1987 | Kumazaki ........................ 264/328.2 |
| 4,963,312 | 10/1990 | Muller .............................. 264/328.16 |
| 5,137,376 | 8/1992 | Gutsche et al. .................... 384/470 |

FOREIGN PATENT DOCUMENTS

| 61-6429 | 1/1986 | Japan . |
| 6446011 | 2/1989 | Japan . |
| 193623 | 4/1989 | Japan . |

OTHER PUBLICATIONS

Patent Abstracts of Japan, vol. 13, No. 300; 11 Jul. 1989; p. 148 and JP 01-093623 A (Koyo Seiko) 12 Apr. 1989 (see abstract).

*Primary Examiner*—Larry I. Schwartz
*Assistant Examiner*—Marc W. Butler
*Attorney, Agent, or Firm*—Sughrue, Mion, Zinn, Macpeak & Seas

[57] ABSTRACT

To provide a ball bearing that insures reasonable endurance and which reduces the necessary torque for rotation while causing less fluctuations in torque, a synthetic resin cage of the ball bearing for retaining a plurality of balls so as to roll freely is impregnated with a lubricating oil having a viscosity of 10 to 150 mm²/s at 40° C. in an amount of 0.1 to 1.0% by weight of the cage, a film of the lubricating oil is formed in a thickness of 0.03 to 20 μm on the surfaces of an inner race, an outer race, balls and the cage, and the amounts of the oiliness agent and the rust inhibitor that are to be contained in the lubricating oils are limited to the specified ranges.

10 Claims, 10 Drawing Sheets

METHOD FOR PRODUCING A CAGE OF THE BALL BEARING

This is a divisional of application Ser. No. 08/174,041 filed Dec. 28, 1993, U.S. Pat. No. 5,401,105.

BACKGROUND OF THE INVENTION

The present invention relates to a ball bearing which is to be used as it is installed in various sections to support rotating members as in hard disk drives (HDDs), video tape recorders (VTRs), digital audio tape recorders (DATs), laser beam printers (LBPs), etc. Further, the present invention relates to a method for producing a cage of such a ball bearing.

A ball bearing of the type shown in FIG. 1 is used extensively to support various kinds of rotating parts. The ball bearing provides a concentric combination of an inner race 2 having an inner raceway track 1 in the surface of an outer circumference thereof and an outer race 4 having an outer raceway track 3 in the surface of an inner circumference thereof, with a plurality of balls 5 being provided between the inner and outer raceway tracks 1 and 3 in such a way that the balls 5 can roll freely. The surfaces of the inner circumferences on both sides of the outer race 4 are engaged with the outer peripheral edges of annular seal plates 6, by which the grease contained or the dust generated in the areas where the balls 5 are installed is prevented from leaking to the outside of the bearing or by which the dust or dirt particles suspended in the atmosphere exterior to the bearing are prevented from entering those areas of installation.

The balls 5 are retained in a cage 7 (see FIGS. 2 and 3) in such a way that the balls 5 can roll freely. The cage 7 is formed as a unitary member by injection molding of a synthetic resin. Stated more specifically, the cage 7 provides an annular main body 8 and a plurality of retaining parts 9 that are provided on one side of the main body 8. Each retaining part 9 consists of a pair of elastic lugs 10 spaced from each other. The opposing faces of the elastic lugs 10 that constitute each retaining part 9 form concave faces of concentric spheres. Each ball 5 is pushed to install between the two elastic lugs 10 in pair as it increases the inter-lug distance, thereby allowing the balls to be held in the individual retaining parts 9 in such a way that they can roll freely.

In the case of a ball bearing of the type that promotes the lubrication of ball rolling parts by means of the grease loaded, between seal plates 6, the resistance to the stirring of the grease increases the torque necessary to rotate shafts and the like that are supported by the ball bearing and, in addition, the torque is apt to fluctuate due to the rotation. Furthermore, the grease causes another problem in that a fairly large amount of dust particles tend to be suspended in air around the ball bearing. If a grease that causes less generation of such dust is used, sound (bearing noise) is prone to develop during the rotation.

Such phenomena of large torque, torque fluctuations, extensive dust generation and production of bearing noise are prone to cause practical problems in small-diameter ball bearings with inside diameters of no more than 6 mm that are to be built in HDDs, VTRs, DATs, LBPs, etc. Particularly in HDDs, deterioration in cleanliness due to extensive dust generation will lead to head damage or reading or writing errors and, hence, should be avoided.

Under these circumstances, various improvements have heretofore been proposed. For example, Unexamined Japanese Patent Publications Nos. Sho. 61-6429 and Hei. 1-93623 teach ball bearings that obviate the use of grease by impregnating the cage with a lubricating oil, and Unexamined Japanese Patent Publication No. Sho. 64-46011 teaches a rotation supporting device that is characterized by using a very small amount of non-grease oil as a lubricant.

However, the ball bearings that have the cage impregnated with a lubricating oil as taught in the Unexamined Japanese Patent Publications Nos. Sho. 61-6429 and Hei. 1-93623 suffer from the disadvantage of high impregnation and, hence, there is the need to make the cage from either a porous material or a special one that will readily absorb oils, causing an inevitable increase in the manufacturing cost. The rotation supporting device that is taught in the Unexamined Japanese Patent Publication No. Sho 64-46011 is not always capable of assuring the necessary amount of lubricating oil and, depending on the use condition, it would be difficult to guarantee satisfactory endurance.

SUMMARY OF THE INVENTION

A ball bearing of the present invention and a method for producing a cage of the ball bearing have been invented to eliminate the above-described difficulties accompanying a conventional ball baring.

More specifically, the object of the present invention is to provide at low cost a ball bearing that insures reasonable endurance and which yet reduces the necessary torque for rotation while causing less fluctuations in torque and which also is capable of reducing the amount of dust (dust generation) and the sound that are produced due to rotation.

To achieve the foregoing object, the ball bearing of the present invention provides an outer race having an outer raceway track in the surface of an inner circumference thereof, an inner race having an inner raceway track in the surface of an outer circumference thereof, a plurality of balls that are provided between the outer raceway track and the inner raceway track, and a synthetic resin cage for retaining the balls in such a way that the balls can roll freely.

The ball bearing of the present invention is special in that the cage is impregnated with a lubricating oil having a viscosity of 10 to 150 mm$^2$/s at 40° C. in an amount of 0.1 to 1.0% by weight of the cage, and that a film of a lubricating oil is formed in a thickness of 0.03 to 20 μm on the surfaces of the outer race, the inner race, the balls and the cage.

Each of the lubricating oils mentioned above contains, based on its total content, 0.5 to 10% by weight of one or more oiliness agents that are selected from among phosphoric acid esters, fatty acids, higher alcohols, amines and organomolybdenum compounds, and 2 to 10% by weight of a rust inhibitor which is either calcium sulfonate or barium sulfonate or both.

The method of the present invention for producing the cage of a ball bearing provides the steps of injection molding a synthetic resin into a predetermined shape, and immersing an injected mold in a heated lubricating oil having a viscosity of 10 to 150 mm$^2$/s at 40° C. for impregnating the lubricating oil in the interior of the mold, and may provide the further step of removing the excess lubricating oil that has adhered to the surface of the mold.

With the ball bearing of the present invention having the construction just described above, each of the four factors at issue, i.e., the necessary torque for rotation, the fluctuations in that torque, dust generation, and the production of bearing noise, is reduced. In addition, at the initial stage of use, the film of lubricating oil as formed on the surfaces of the outer race, inner race, balls and the cage will insure effective lubrication on the surfaces of contact between respective parts and, after a certain time has passed since the start of use, the lubricating oil as impregnated in the cage will ooze out for a prolonged period; therefore, effective lubrication is performed and excellent endurance is exhibited over an extended period as soon as the use of the bearing starts and until after the passage of a long time.

It should be mentioned here that the viscosity expressed in $mm^2/s$ (=cSt) coincides with the midpoint of the viscosity range (the midpoint±10%) that is expressed by the same values in ISO VG.

BRIEF DESCRIPTION OF THE DRAWINGS

In the accompanying drawings:

FIGS. 12(i) to 12(vii) are flow sheets for seven examples of a method for producing the cage of the ball bearing;

DETAILED DESCRIPTION OF THE PREFERRED EMBODIMENTS

Figure 1:
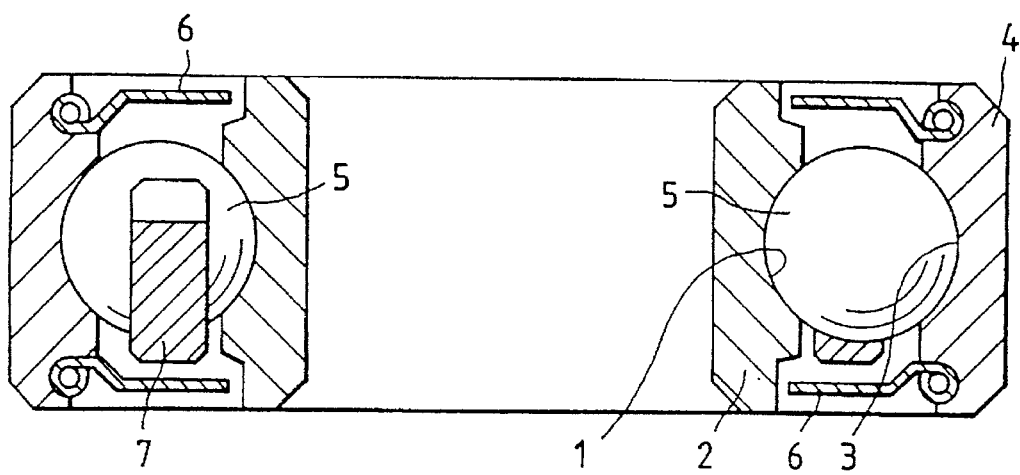
FIG. 1 is a cross-sectional view showing an example of the ball bearing contemplated by the present invention.

As shown in FIG. 1, a ball bearing of the present invention provides a concentric combination of an inner race 2 having an inner raceway track 1 in the surface of an outer circumference thereof and an outer race 4 having an outer raceway track 3 in the surface of an inner circumference thereof, with a plurality of balls 5 being provided between the inner and outer raceway tracks 1 and 3 in such a way that the balls 5 can roll freely. The surfaces of the inner circumferences on both sides of the outer race 4 are engaged with the outer peripheral edges of annular seal plates 6, by which the grease contained or the dust generated in the areas where the balls 5 are in stalled is prevented from leaking to the outside of the bearing or by which the dust or dirt particles suspended in the atmosphere exterior to the bearing are prevented from entering those areas of installation.

The balls 5 are retained in a cage 7 (see FIGS. 2 and 3) in such a way that the balls 5 can roll freely. The cage 7 is formed as a unitary member by injection molding of a synthetic resin. Stated more specifically, the cage 7 provides an annular main body 8 and a plurality of retaining parts 9 that are provided on one side of the main body 8. Each retaining part 9 consists of a pair of elastic lugs 10 spaced from each other. The opposing faces of the elastic lugs 10 that constitute each retaining part 9 form concave faces of concentric spheres. Each ball 5 is pushed to install between the two elastic lugs 10 in pair as it increases the inter-lug distance, thereby allowing the balls to be held in the individual retaining parts 9 in such a way that they can roll freely.

In the first embodiment of the present invention, the viscosity of the lubricating oil to be impregnated in the cage is controlled to 10 to 150 $mm^2/s$ and the amount of its impregnation to 0.1 to 1.0% by weight for the following reasons.

If the viscosity of the lubricating oil at 40° C. is less than 10 $mm^2/s$, its retainability in the cage is poor (early oozed out of the cage) and its shortage would occur in the early period of use. If, on the other hand, a lubricating oil of high viscosity in excess of 150 $mm^2/s$ at 40° C. is used, it cannot be easily impregnated in the synthetic resin of which the cage is made, causing a shortage of its impregnation in the cage. Thus, irrespective of whether the viscosity of the lubricating oil at 40° C. is less than 10 $mm^2/s$ or greater than 150 $mm^2/s$, there will occur early shortage of the lubricating oil to be supplied from the cage to the areas of ball rolling, whereby the endurance of the ball bearing is impaired. Therefore, the lubricating oil to be impregnated in the cage is specified to have a viscosity of 10 to 150 $mm^2/s$ at 40° C.

In the next place, if the amount of impregnation of the lubricating oil is less than 0.1% by weight, the absolute quantity of the lubricating oil is insufficient and there will occur early depletion of the lubricating oil to be supplied from the cage to the areas of ball rolling, whereby the endurance of the ball bearing is impaired. On the other hand, even if the lubricating oil is impregnated in amounts exceeding 1.0% by weight, there can be no improvement in endurance to the practically necessary level and yet the time required to impregnated the lubricating oil in the synthetic resin of which the cage is made is unduly prolonged. If the time of impregnation is thusly prolonged, the efficiency of cage production is reduced, leading to a higher price of the ball bearing. Therefore, the amount in which the lubricating oil is to be impregnated in the cage is specified to be within the range from 0.1 to 1.0% by weight based on the weight of the cage.

Figure 2:
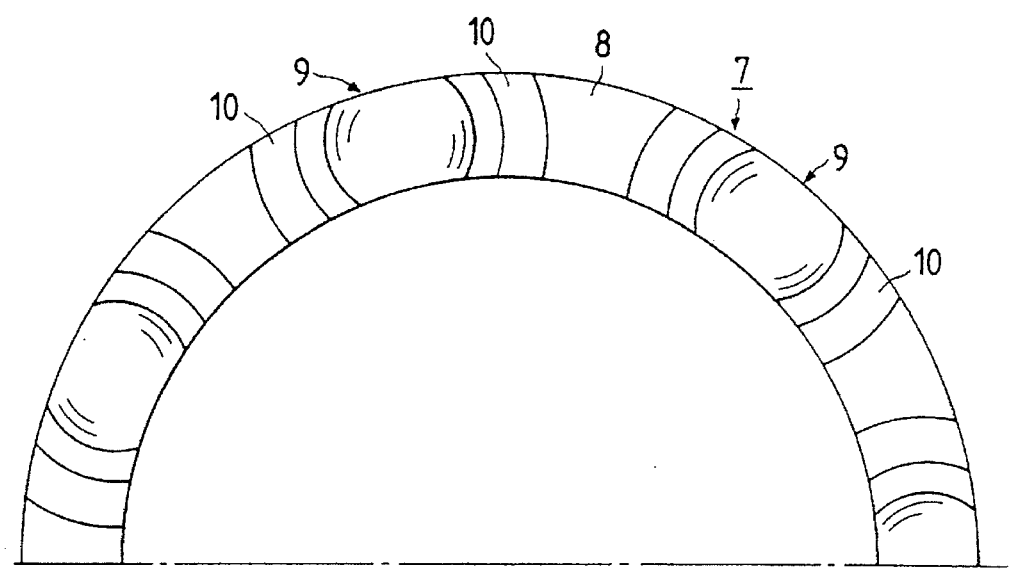
FIG. 2 is a plan view showing enlarged in half section an example of the cage.
Figure 3:
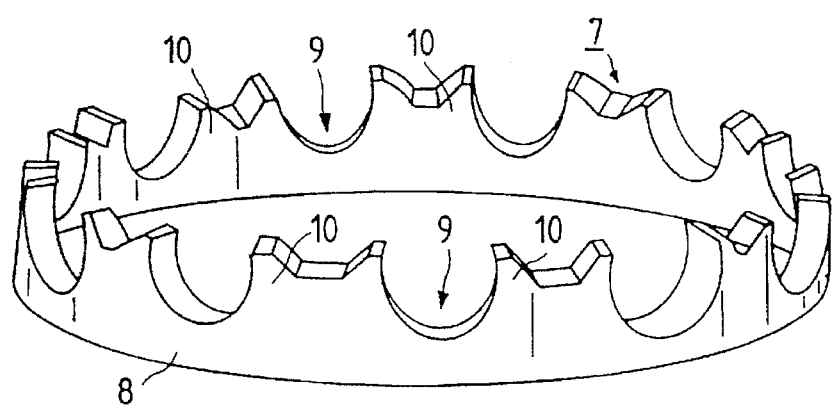
FIG. 3 is an enlarged perspective view of the cage.

Described below are the experiments the present inventors conducted with a view to verifying the effectiveness of the first embodiment of the present invention. The experimentation was made using miniaturized ball bearings having an inside diameter of 5 mm, an outside diameter of 13 mm and a thickness of 4 mm. The cage 7 that was used in the experiments was made of a polyamide resin and shaped like a crown as shown in FIGS. 1 to 3. When constructing the ball bearing of the present invention, the cage 7 was immersed in a poly(α-olefin) base synthetic lubricating oil having a viscosity of 46 $mm^2/s$ at 40° C. and left to stand for 3 hours with the temperature of the lubricating oil being held at 100° C. As a result, the cage 7 was impregnated with the lubricating oil in an amount of 0.37% by weight of the cage 7. Conventional models that were use for comparison were lubricated with two common types of grease, NS7 grease (lithium soap grease; trade name, "NS Hi-Lube") and AKC grease (sodium soap grease; trade name, "Andok C"). Either type of grease was loaded in an amount of 15 mg.

Figure 4A:
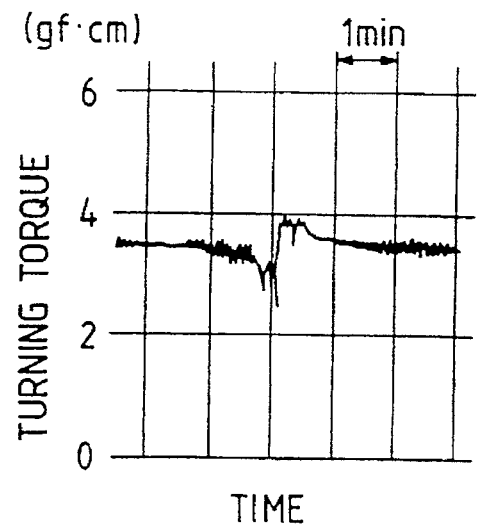
FIGS. 4(A), 4(B) and 4(C) are graphs plotting the values of measurement of turning torque.
Figure 4B:
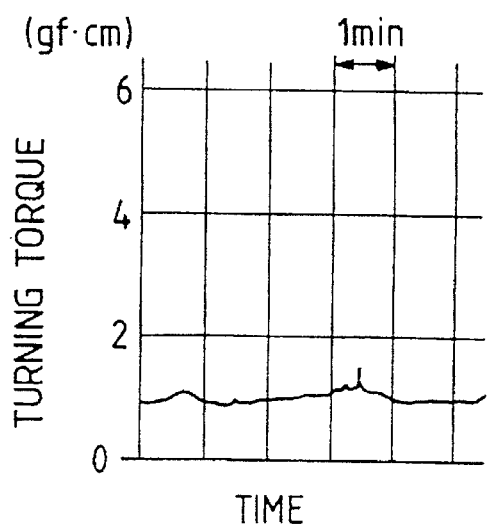
Figure 4C:
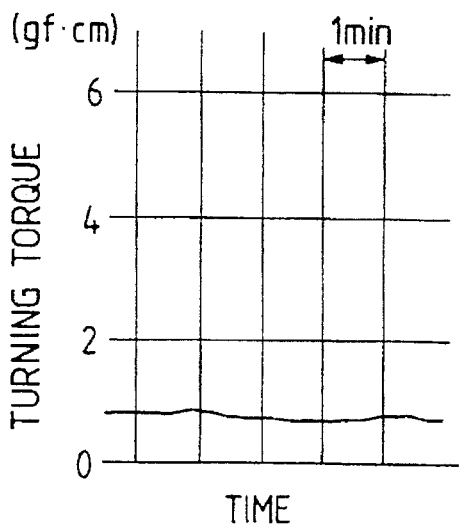

In the first experiment, turning torque measurements were conducted on the ball bearing of the present invention that had the cage 7 installed in the manner just described above and on the conventional ball bearings lubricated with grease. The results are shown in FIGS. 4(A) to 4(C). FIG. 4(A) plots the turning torque of the conventional model lubricated with NS7 grease; FIG. 4(B) plots the turning torque of the conventional model lubricated with AKC grease; and FIG. 4(C) plots the turning torque of the model of the present invention. As shown in FIGS. 4(A) to 4(C), the ball bearing of the present invention requires a smaller turning torque and experiences less fluctuations in torque than the conventional models.

Figure 5A:
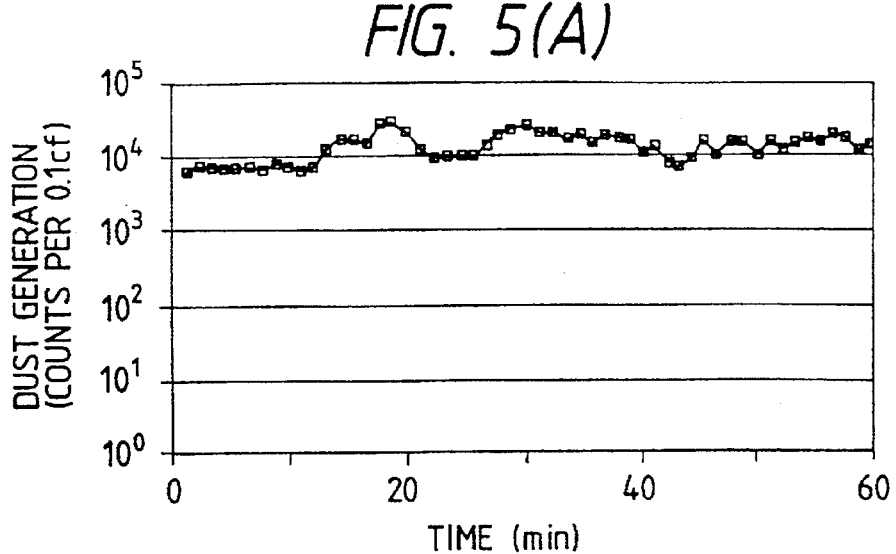
FIGS. 5(A) and 5(C) are graphs plotting the values of measurement of dust generation.
Figure 5B:
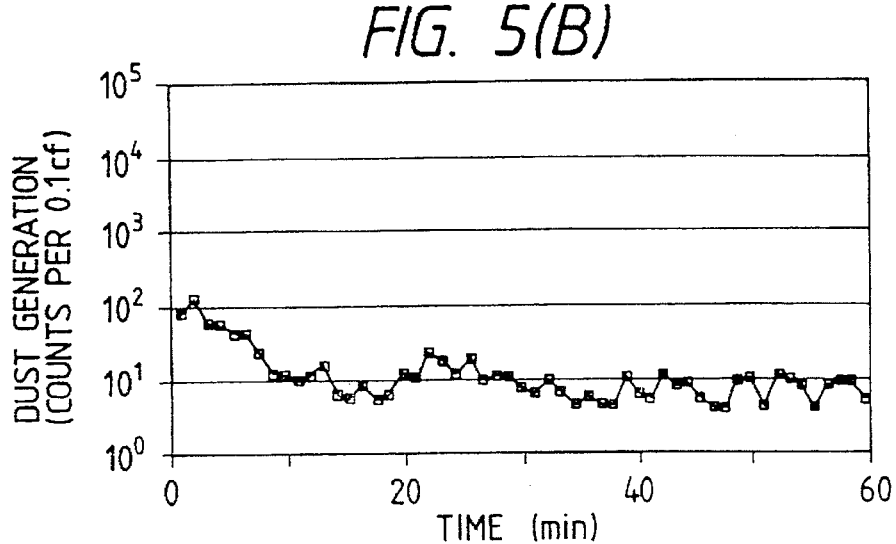
Figure 5C:
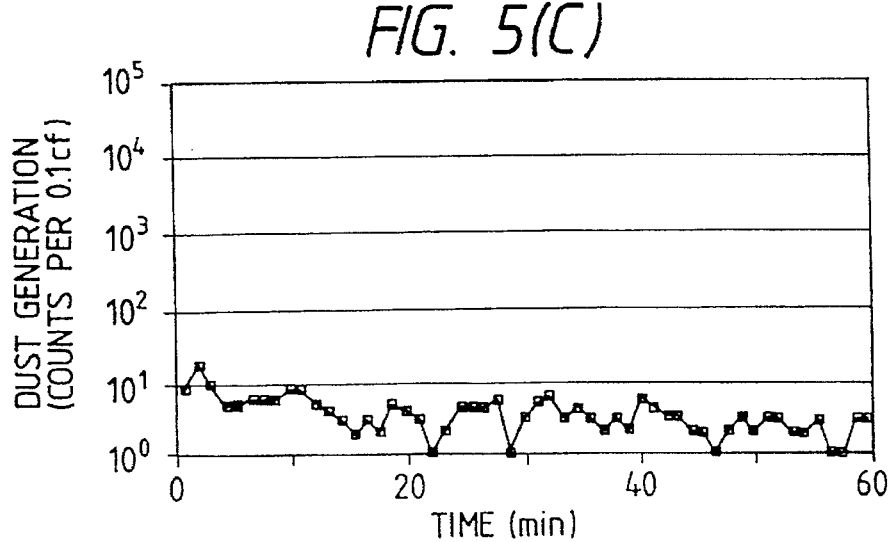

In the second experiment, there was measured the amount of dust as generated when the ball bearings of three models measured in FIGS. 4(A) to 4(C) were rotated. To rotate the ball bearings, the inner race 2 was turned at 3,600 rpm as the bearing was applied with a pre-load of 2 kgf. Dust generation was measured by counting the number of dust particles that were within a volume of 0.1 cf (cubic feet) and which were not smaller than 0.1 µm in diameter. The results are shown in FIGS. 5(A) to 5(C). FIG. 5(A) plots the amount of dust generation in the conventional model lubricated with NS7 grease; FIG. 5(B) plots the amount of dust generation in the conventional model lubricated with AKC grease; and FIG. 5(C) plots the amount of dust generation in the model of the present invention. As shown in FIGS. 5(A) to 5(C), the ball bearing of the present invention generates a smaller amount of dust than the model that used AKC grease which is a typical type of low-dust grease.

Figure 6A:
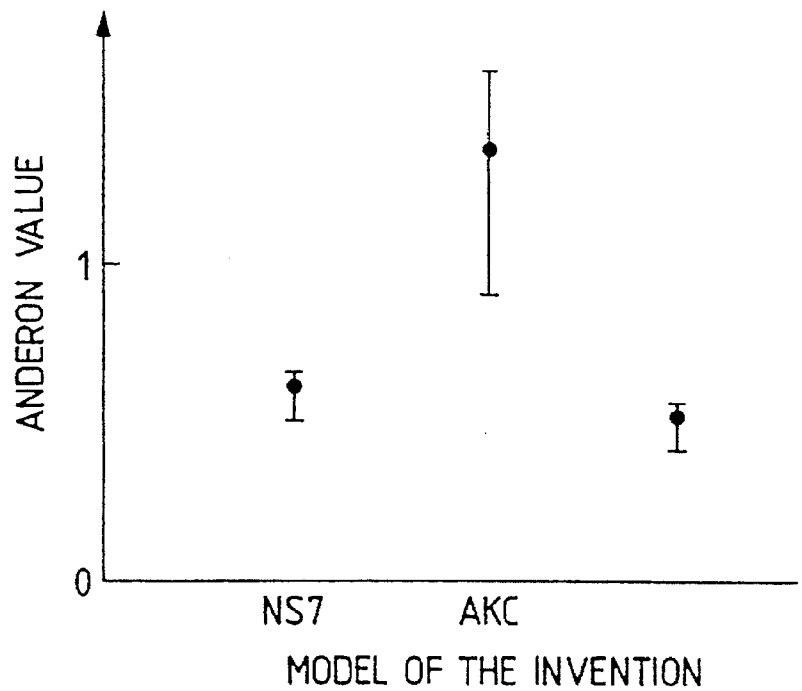
FIGS. 6(A) and 6(B) are graphs plotting the data of measurement of acoustic characteristics.
Figure 6B:
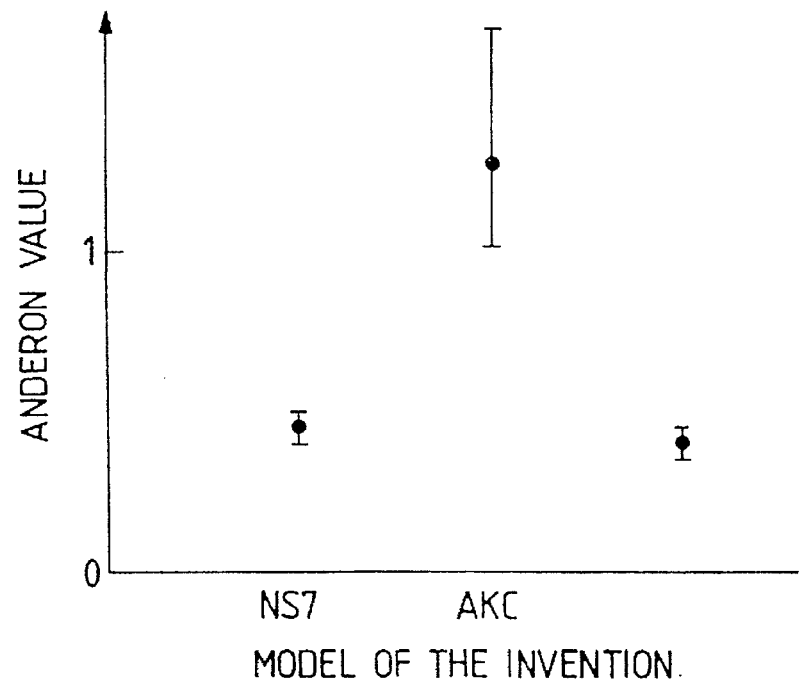

In the third experiment, the sound that developed due to the rotation of the three ball bearings was measured. To rotate the ball bearings, the inner race 2 was turned at 3,600 rpm as the bearing was applied with the pre-load of 2 kgf. The results are shown in FIGS. 6(A) and 6(S), the vertical axis of which is graduated by the Andeton value which is commonly used to express the acoustic characteristics of bearings. FIG. 6(A) plots the acoustic characteristic in the medium band of frequencies around 1,000 Hz; and FIG. 6(B) plots the acoustic characteristic in the high band of frequencies higher that 1,000 Hz. In each graph, the vertical bar on the left represents the acoustic characteristic of the conventional model lubricated with NS7 grease, the vertical bar in the center represents the acoustic characteristic of the conventional model lubricated with AKC grease, and the vertical bar on the right represents the acoustic characteristic of the model of the present invention. The top end of each vertical bar refers to a maximum level of the sound generated, the bottom end to a minimum level of the same sound, and the dot in the middle to the average.

As shown in FIGS. 6(A) and 6(B), the ball bearing of the present invention had by far better acoustic characteristics than the model that used AXC grease; in addition, the acoustic characteristics were at least comparable to those of the model that used NS7 grease.

Figure 7A:
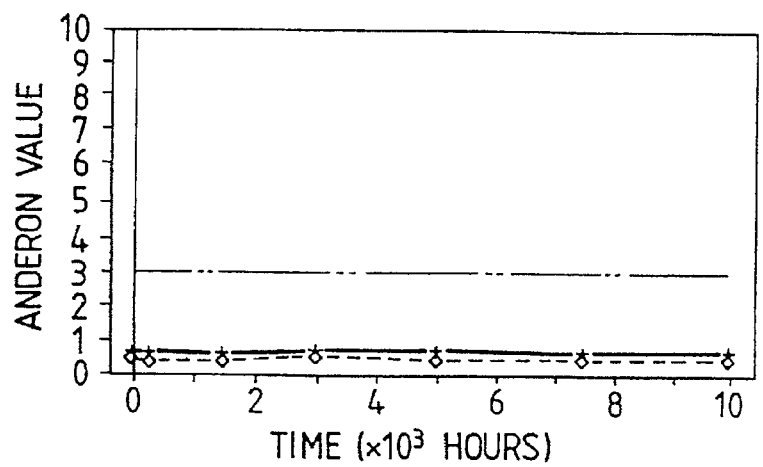
FIGS. 7(A), 7(B) and 7(C) are graphs showing the relationship between the time passed and the acoustic characteristics as observed in the first endurance test.
Figure 7B:
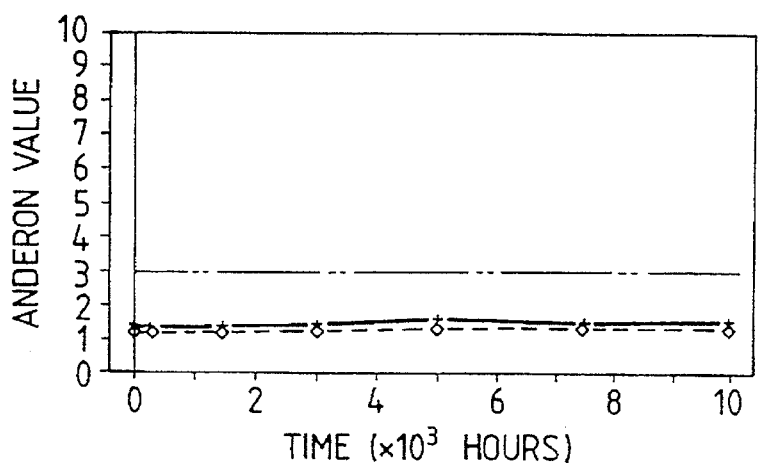
Figure 7C:
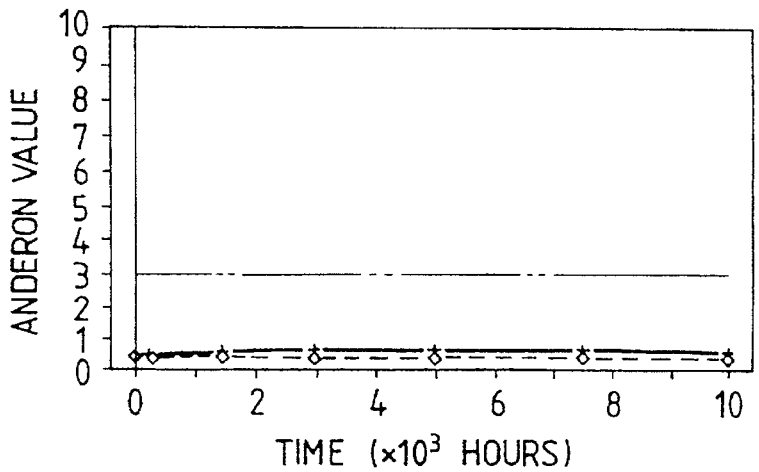

In the fourth experiment, the endurance of the three ball bearings was measured. The endurance test was conducted by rotating the inner race 2 at 3,600 rpm for 10,000 hours, with the temperature held at 60° C. and the bearing applied with the pre-load of 2 kgf. The life of a ball bearing was regarded to have expired when the Anderon value in either one of medium and high frequency bands exceeded 3. The test results are shown in FIGS. 7(A) to 7(C) FIG. 7(A) plots the change in the Anderon value of the conventional model that was lubricated with NS7 grease; FIG. 7(B) plots the change in the Anderon value of the conventional model that was lubricated with AKC grease; and FIG. 7(C) plots the change in the Anderon value of the model of the present invention. In each of the FIGS. 7(A) to 7(C) graphs, "+" refers to the Anderon value in the medium frequency band, and "◊" to the Anderon value in the high frequency band.

As shown in FIGS. 7(A) to 7(C), all samples of ball bearing under test exhibited satisfactory endurance. Stated more specifically, none of the Anderon values of these bearings reached 3 after the passage of 10,000 hours, nor did they show any tendency to increase after the passage of 10,000 hours. It can hence be estimated that each of the ball bearings under consideration will have a life much longer than 10,000 hours.

The fifth experiment was conducted in order to know the effect that would be caused on the endurance of ball bearings by the viscosity of the lubricating oil to be impregnated in the cage 7. Two test samples [see below under (1) and (2)] were prepared. The size of the ball bearing, the material of the cage 7 and other specifications of the ball bearing were as already described above.

test sample (1): Ball bearing having installed therein the cage 7 that was impregnated with 0.37% by weight of a lubricating oil having a viscosity of 46 mm$^2$/s at 40° C.; and test sample (2): Ball bearing having installed therein the cage 7 that was impregnated with 0.45% by weight of a lubricating oil having a viscosity of 10 mm$^2$/s at 40° C.

Figure 8A:
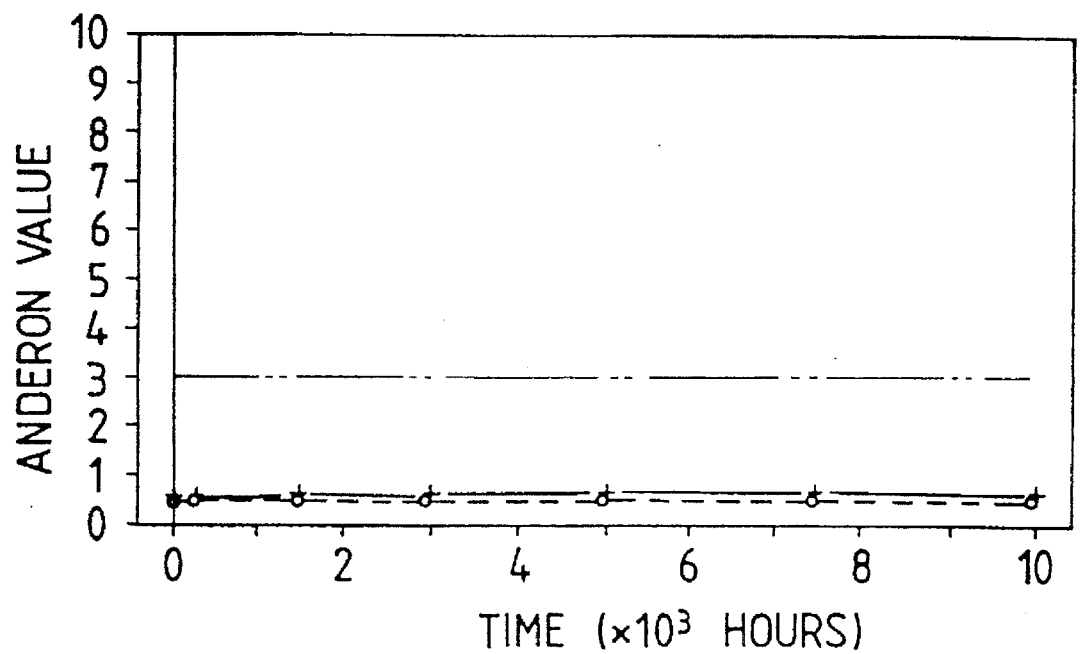
FIGS. 8(A) and 8(B) are graphs showing the relationship between the time passed and the acoustic characteristics as observed in the second endurance test.
Figure 8B:
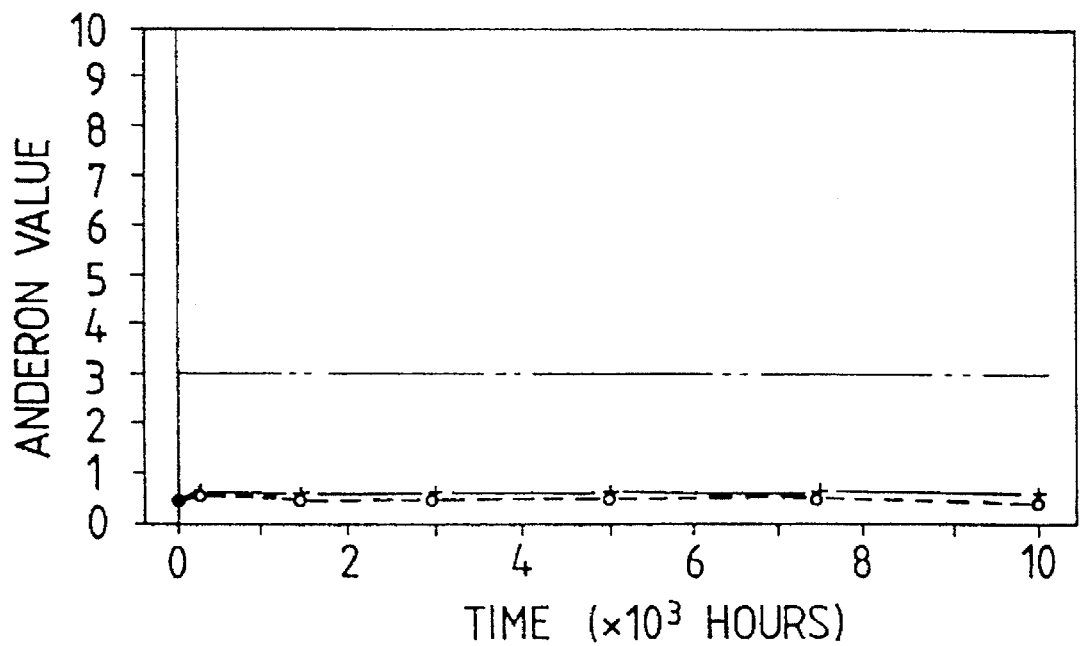

The two test samples (1) and (2) were subjected to an endurance test under the same conditions as set forth above (temperature, 60° C.; bearing applied with the pre-load of 2 kgf; inner race rotated continuously at 3,600 rpm for 10,000 hours). The results of the endurance test are shown is FIGS. 8(A) and 8(B). FIG. 8(A) plots the change in the Anderon value of the test sample (1), and FIG. 8(B) plots the change in the Anderon value of the test sample (2). In each of the FIGS. 8(A) and 8(B) graphs, "+" refers to the Andeton value in the medium frequency band, and "◊," to the Andeton value in the high frequency band.

As shown in FIGS. 8(A) and 8(B), the cage 7 that was impregnated with a lubricating oil having a viscosity of at least 10 mm$^2$/s at 40° C. could assure satisfactory endurance for the ball bearing that had this cage 7 built therein.

The sixth experiment was conducted to know the effect that would be caused on the endurance of ball bearings by the amount in which a lubricating oil was impregnated in the cage 7. Two test samples [see below under (3) and (4)] were prepared. The size of the ball bearing, the material of the cage 7 and other specifications of the ball bearing were as already described above.

test sample (3): Ball bearing having installed therein the cage 7 that was impregnated with 0.07% by weight of a lubricating oil having a viscosity of 150 mm$^2$/s at 40° C.; and test sample (4): Ball bearing having installed therein the cage 7 that was impregnated with 0.11% by weight of a lubricating oil having a viscosity of 150 mm$^2$/s at 40° C.

Figure 9A:
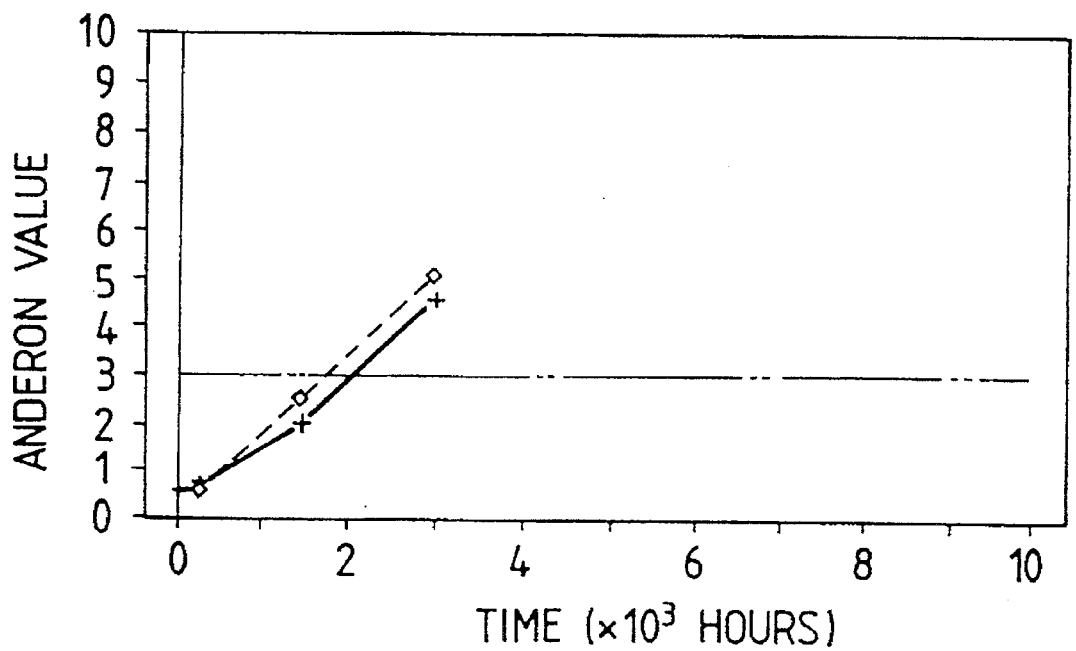
FIGS. 9(A) and 9(B) are graphs showing the relationship between the time passed and the acoustic characteristics as observed in the third endurance test.
Figure 9B:
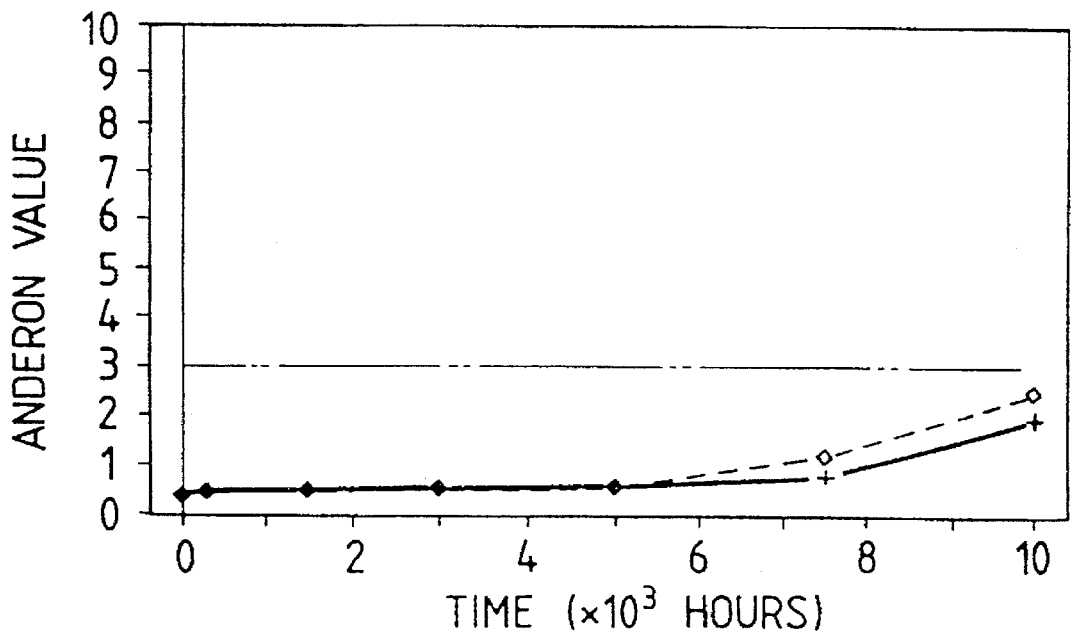

The two test samples (3) and (4) were subjected to an endurance test under the same conditions as set forth above (temperature, 60° C.; bearing applied with the pre-load of 2 kgf; inner race rotated continuously at 3,600 rpm for 10,000 hours). The results of the endurance test are shown in FIGS. 9(A) and 9(B). FIG. 9(A) plots the change in the Anderon value of the test sample (3), and FIG. 9(B) plots the change in the Anderon value of the test sample (4). In each of the FIGS. 9(A) and 9(B) graphs, "+" refers to the Anderon value in the medium frequency band, and "◊" to the Anderon value in the high frequency band.

As shown in FIGS. 9(A) and 9(B), when the cage 7 was impregnated with less than 0.10% by weight of the lubricating oil, the ball bearing that had the cage built in it was unsatisfactory in endurance even when the lubricating oil had high viscosity (150 mm²/s).

The above-described first to sixth experiments concerned the case where the ball bearing of the present invention was such that only the cage 7 was impregnated with a lubricating oil but that no film of the lubricating oil was preliminarily deposited on the rolling surfaces of the inner raceway track 1, outer raceway track 3 and balls 5. If desired, a suitable lubricating oil may be preliminarily deposited in a suitable amount on the rolling surfaces of the inner raceway track 1, outer raceway track 3 and balls 5. This preliminary deposition of lube oil film is generally referred to as the application of "oil plating" and described below are the experiments that were conducted in order to determine appropriate values for the viscosity and amount of the lubricating oil to be plated.

In the seventh experiment, there is described an experiment that was conducted to determine an appropriate value for the viscosity of the lubricating oil to be plated. In the experiment, a miniaturized ball bearing having an inside diameter of 5 mm was used, and the cage 7 was made of a polyamide resin and shaped like the crown; it was impregnated with 0.37% by weight of a poly(α-olefin) base synthetic oil having a viscosity of 46 mm²/s at 40° C.

Oil plating was effected by the following procedure: the ball bearing as assembled using the impregnated cage 7 was immersed in a volatile solvent having dissolved therein a lubricating oil (mineral oil) to be plated; thereafter, the ball bearing was recovered and the volatile solvent was evaporated. The lubricating oil and the volatile solvent that adhered to both end faces of the inner race 2 and the surface of the inner circumference thereof, as well as both end faces of the outer race 4 and the surface of the outer circumference were wiped off as soon as the ball bearing was recovered. The proportion of the lubricating oil that was contained to the solvent was 3% by weight. As a result of these steps, the ball bearing had the film of mineral oil deposited in an amount of 1.5 mm².

Figure 10:
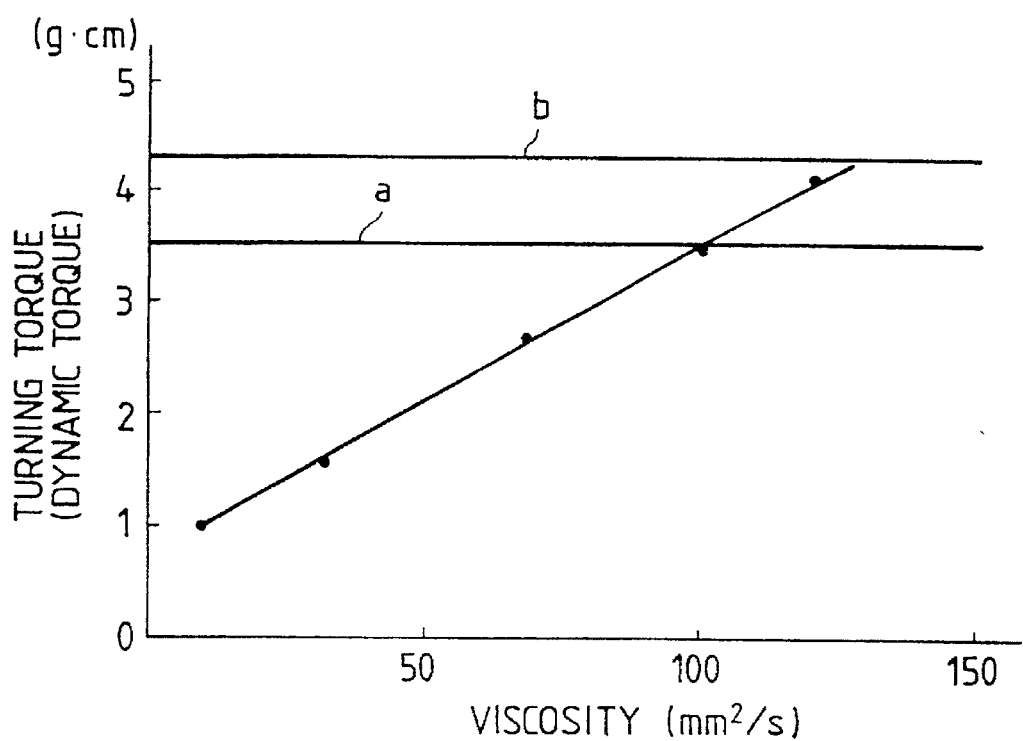
FIG. 10 is a graph showing the relationship between the turning torque and the viscosity of lubricating oil used in oil plating.

With the viscosity of the mineral oil being varied, a plurality of ball bearing samples were constructed and the relationship between the turning torque (dynamic torque) and viscosity was measured on each bearing, and the results were as shown in FIG. 10. Straight line a in FIG. 10 plots the turning torque of the conventional model that was lubricated with AKC grease, and straight line o plots the turning torque of the conventional model that was lubricated with NS7 grease. As shown in FIG. 10, the turning torque could be made lower than in the conventional models by performing "oil plating" with a lubricating oil having a viscosity no higher than 100 mm²/s at 40° C.

Figure 11:
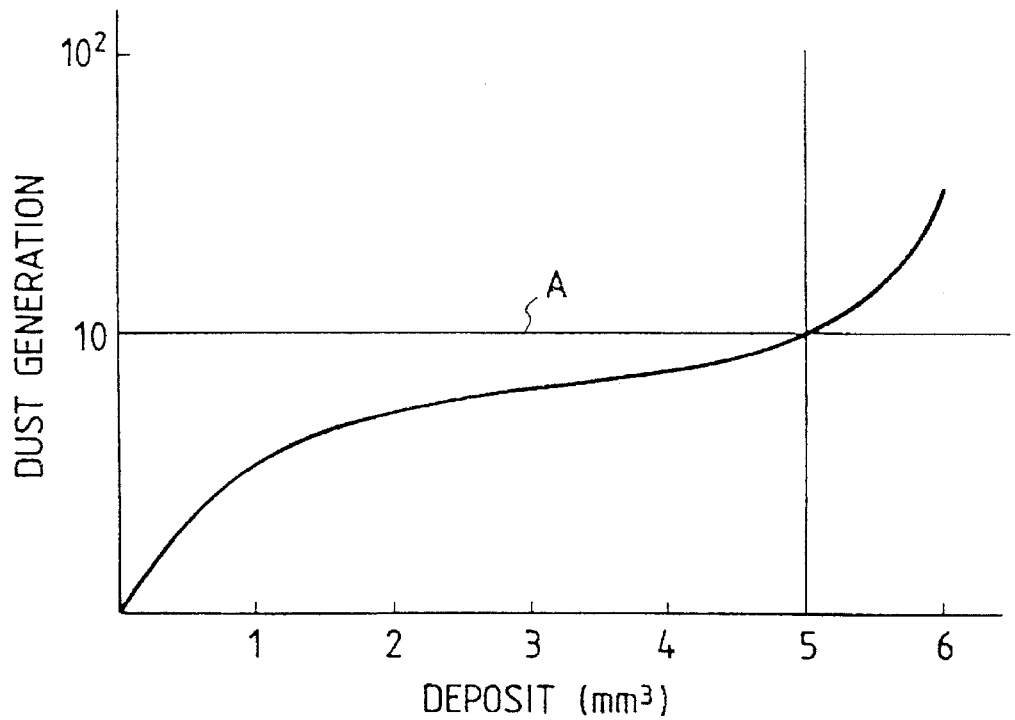
FIG. 11 is a graph showing the relationship between dust generation and the amount of deposition of lubricating oil used in oil plating.

In the eighth experiment, there is described an experiment that was conducted to measure the relationship between the amount of lubricating oil to be deposited in the ball bearing by "oil plating" and the amount of dust generation due to the rotation of the bearing. The lubricating oil used in the experiment was a mineral oil having a viscosity of 68 mm²/s at 40° C. The amount of deposition was adjusted by altering the amount of the mineral oil (% by weight) to be dissolved in the volatile solvent. The results of the experiment are shown in FIG. 11. Straight line A in FIG. 11 plots the amount of dust generation in the conventional model that used AKC grease. As shown in FIG. 11, the amount of dust generation could be made smaller than in the conventional model by reducing the deposit of lube oil film to 5 mm³ and below. It should be mentioned here that the differences in film deposition by "oil plating" hardly affected the turning torque of the ball bearing and the fluctuations in torque.

Another ball bearing having an inside diameter of 5 mm was constructed by having installed therein a cage 7 that was oil-plated with 1.5 mm³ of a mineral having a viscosity of 68 mm²/s at 40° C. and which was impregnated with 0.37% by weight o of a poly(α-olefin) base synthetic lubricating oil having a viscosity of 46 mm²/s at 40° C. This bearing was subjected to tests for evaluating the turning torque, dust generation, acoustic characteristic and life under the same conditions as those employed for the ball bearing that was not oil-plated. The results were substantially the same as with the non-oil plated model, except that the oil plating was effective in enabling the ball bearing to exhibit good performance in terms of turning torque and acoustic characteristic before the lubricating oil oozed out of the cage.

Further, there is be described the second embodiment of the present invention under circumstances different from the above-described first to eighth experiments of the first embodiment.

In order to insure that the turning torque is kept low and stable in the ball bearing as soon as it starts to be used and to keep the bearing noise at low level, a film of a lubricating oil is formed on the surfaces of the outer race, inner race, balls and the cage. If the film thickness is less than 0.03 μm, there will be local absence of the lubricating oil in various parts and this causes not only instability in the turning torque right after the start of use but also insufficiency in endurance. If, on the other hand, the film thickness exceeds 20 μm, the presence of the lubricating oil provides a resistance and this not only increases but also instabilizes the turning torque. In addition, there occurs increased dust generation. Under these circumstances, the thickness of the film of lubricating oil to be formed on the surfaces of the outer race, inner race, balls and the cage is specified to lie within the range from 0.3 to 20 μm. To further reduce the turning torque and the fluctuations in torque and to insure that dust generation is held to a lower level, the thickness of the film is preferably adjusted to 1 to 10 μm.

The lubricating oil that is to be impregnated in the cage 7, as well as the lubricating oil that is to form a film the surfaces of the outer race, inner race, balls and the cage has one or more oiliness agents contained in amounts of 0.5 to 10% by weight, the percentage being based on the total content of each lubricating oil. The oiliness agents are selected from among phosphoric acid esters such as phosphates, phosphonates and phosphinates, higher fatty acids having 6 to 26 carbon atoms, higher alcohols, amines, and organomolybdenum compounds such as molybdenum dithiocarbamate and molybdenum dithiophosphate.

The oiliness agents are contained for the purpose of enhancing the wear reducing effect of the lubricating oils. If their addition is less than 0.5% by weight based on the weight of the lubricating oil, the intended effect of their addition will not be attained. On the other hand, even if they are contained in amounts exceeding 10% by weight based on the weight of the lubricating oil, the commensurate effect is not expected but the cost will only increase. Hence, the amount of addition of the oiliness agent is limited to the range from 0.5 to 10% by weight based on the weight of the lubricating oil used.

Further, the rust inhibitor is contained in order to prevent the corrosion of the surfaces of the outer race, inner race and the balls. If the addition of the rust inhibitor is less than 2% by weight based on the weight of the lubricating oil in which it is contained, only insufficient rust inhibiting effect will be attained. On the other hand, the rust inhibitor, if it is contained in amounts exceeding 10% by weight based on the weight of the lubricating oil in which it is contained, will only impair the endurance of the ball bearing. For these reasons, the addition of the rust inhibitor is limited to the range from 2 to 10% by weight based on the weight of the lubricating oil in which it is contained.

Described below are the experiments the present inventors conducted with a view to verifying the effectiveness of the second embodiment of the present invention. The experimentation was made using miniaturized ball bearings having an inside diameter of 5 mm, an outside diameter of 13 mm and a thickness of 4 mm. The cage 7 that was used in the experiments was made of a polyamide resin and shaped like the crown as shown in FIGS. 1 to 3. A total of 31 test samples were prepared in adaptation from the ball bearing of the type just described above by altering the composition of lubricating oils, the amount of their impregnation in the cage 7, and the thicknesses of films on the surfaces of the balls, outer race, inner race and the cage as shown in Tables 1 to 4 below; 22 of those test samples were examples in accordance with the present invention and 9 were comparative examples outside the scope of the invention.

To impregnate the cage 7 with lubricating oils, it was immersed for 3 hours in a lubricating oil of interest as the latter was held at 100° C. To form films of lubricating oils on the surfaces of the inner race 2, outer race 4, balls 5 and the cage 7, the assembled ball bearing was first immersed in a lubricating oil of interest at ordinary temperature, then the lubricating oil adhering to the surfaces was blown off with compressed air, followed by putting the ball bearing in a centrifuge, which was operated to remove the lubricating oil from the surfaces of the respective members. Film thickness adjustment was made by controlling the magnitude of centrifugal force that was generated by the centrifuge and the duration of time for which the centrifugation was continued.

TABLE 1

| Examples | Lubricating oil | | | Impregnation of lube oil in cage | Amount of impregnation of lube oil in cage (% by weight) | Thickness of lube oil film on balls and inner and outer races (μm) | Turning torque and fluctuations in torque (gf.cm) | Dust generation (counts in 0.1 cf) | Bearing noise (Anderon value) | Endurance test (h) | Rust inhibition test |
|---|---|---|---|---|---|---|---|---|---|---|---|
| | base oil (mm²s) | oiliness agent (% by weight) | rust inhibitor (% by weight) | | | | | | | | |
| 1 | ester oil (12) | tricresyl phosphate (4) | calcium sulfonate (6) | yes | 0.4 | 4 | 0.8 ± 0.1 | ca. 10 | M.B. 0.6 H.B. 0.5 | ≧20000 | O.K. |
| 2 | ester oil (33) | tricresyl phosphate (4) | calcium sulfonate (6) | yes | 0.35 | 4 | 0.8 ± 0.1 | ca. 10 | M.B. 0.6 H.B. 0.5 | ≧20000 | O.K. |
| 3 | ester oil (68) | tricresyl phosphate (4) | calcium sulfonate (6) | yes | 0.3 | 4 | 1.0 ± 0.1 | ca. 10 | M.B. 0.6 H.B. 0.5 | ≧20000 | O.K. |
| 4 | ester oil (140) | tricresyl phosphate (4) | calcium sulfonate (6) | yes | 0.25 | 4 | 1.2 ± 0.1 | ca. 10 | M.B. 0.6 H.B. 0.5 | ≧20000 | O.K. |
| 5 | ester oil (12) | tricresyl phosphate (0.5) | calcium sulfonate (6) | yes | 0.4 | 4 | 0.8 ± 0.1 | ca. 10 | M.B. 0.6 H.B. 0.5 | ≧20000 | O.K. |
| 6 | ester oil (12) | tricresyl phosphate (10) | calcium sulfonate (6) | yes | 0.4 | 4 | 0.8 ± 0.1 | ca. 10 | M.B. 0.6 H.B. 0.5 | ≧20000 | O.K. |
| 7 | ester oil (12) | tricresyl phosphate (4) | calcium sulfonate (2) | yes | 0.4 | 4 | 0.8 ± 0.1 | ca. 10 | M.B. 0.6 H.B. 0.5 | ≧20000 | O.K. |
| 8 | ester oil (12) | tricresyl phosphate (4) | calcium sulfonate (10) | yes | 0.4 | 4 | 0.8 ± 0.1 | ca. 10 | M.B. 0.6 H.B. 0.5 | 18000 | O.K. |

TABLE 2

| Examples | Lubricating oil | | | Impregnation of lube oil in cage | Amount of impregnation of lube oil in cage (% by weight) | Thickness of lube oil film on balls and inner and outer races (μm) | Turning torque and fluctuations in torque (gf.cm) | Dust generation (counts in 0.1 cf) | Bearing noise (Anderon value) | Endurance test (h) | Rust inhibition test |
| | base oil (mm²/s) | oiliness agent (% by weight) | rust inhibitor (% by weight) | | | | | | | | |
|---|---|---|---|---|---|---|---|---|---|---|---|
| 9 | ester oil (12) | oleic acid (4) | calcium sulfonate (6) | yes | 0.4 | 4 | 0.8 ± 0.1 | ca. 10 | M.B. 0.6 H.B. 0.5 | ≧20000 | O.K. |
| 10 | ester oil (12) | molybdenum dithiophosphate (4) | calcium sulfonate (6) | yes | 0.4 | 4 | 0.8 ± 0.1 | ca. 10 | M.B. 0.6 H.B. 0.5 | ≧20000 | O.K. |
| 11 | ester oil (12) | stearylamine (4) | calcium sulfonate (6) | yes | 0.4 | 4 | 0.8 ± 0.1 | ca. 10 | M.B. 0.6 H.B. 0.5 | ≧20000 | O.K. |
| 12 | ester oil (12) | tricresyl phosphate (4) | barium sulfonate (6) | yes | 0.4 | 4 | 0.8 ± 0.1 | ca. 10 | M.B. 0.6 H.B. 0.5 | ≧20000 | O.K. |
| 13 | ester oil (12) | tricresyl phosphate (0.5) | calcium sulfonate (6) | yes | 0.1 | 4 | 0.8 ± 0.1 | ca. 10 | M.B. 0.6 H.B. 0.5 | 18000 | O.K. |
| 14 | ester oil (12) | tricresyl phosphate (4) | calcium sulfonate (6) | yes | 1 | 4 | 0.8 ± 0.1 | ca. 10 | M.B. 0.6 H.B. 0.5 | ≧20000 | O.K. |
| 15 | ester oil (12) | tricresyl phosphate (4) | calcium sulfonate (6) | yes | 0.4 | 0.03 | 0.7 ± 0.1 | ca. 10 | M.B. 0.6 H.B. 0.5 | 18000 | O.K. |
| 16 | ester oil (12) | tricresyl phosphate (4) | calcium sulfonate (6) | yes | 0.4 | 20 | 1.1 ± 0.1 | 60 to 80 | M.B. 0.6 H.B. 0.5 | ≧20000 | O.K. |

TABLE 3

| Examples | Lubricating oil | | | Impregnation of lube oil in cage | Amount of impregnation of lube oil in cage (% by weight) | Thickness of lube oil film on balls and inner and outer races (μm) | Turning torque and fluctuations in torque (gf.cm) | Dust generation (counts in 0.1 cf) | Bearing noise (Andersen value) | Endurance test (h) | Rust inhibition test |
| | base oil (mm²/s) | oiliness agent (% by weight) | rust inhibitor (% by weight) | | | | | | | | |
|---|---|---|---|---|---|---|---|---|---|---|---|
| 17 | ester oil (16) | tricresyl phosphate (4) | calcium sulfonate (6) | yes | 0.4 | 4 | 0.8 ± 0.1 | ca. 10 | M.B. 0.6 H.B. 0.5 | >20000 | O.K. |
| 18 | synthetic hydrocarbon oil (18) | tricresyl phosphate (4) | calcium sulfonate (6) | yes | 0.4 | 4 | 0.8 ± 0.1 | ca. 10 | M.B. 0.6 H.B. 0.5 | >20000 | O.K. |
| 19 | mineral oil (20) | tricresyl phosphate (4) | calcium sulfonate (6) | yes | 0.4 | 4 | 0.8 ± 0.1 | ca. 10 | M.B. 0.6 H.B. 0.5 | >20000 | O.K. |
| 20 | ester oil (12) | tricresyl phosphate (4) | calcium sulfonate (6) | yes | 0.4 | 1 | 0.7 ± 0.1 | ca. 10 | M.B. 0.6 H.B. 0.5 | >20000 | O.K. |
| 21 | ester oil (12) | tricresyl phosphate (4) | calcium sulfonate (6) | yes | 0.4 | 10 | 0.9 ± 0.1 | ca. 10 | M.B. 0.6 H.B. 0.5 | >20000 | O.K. |
| 22 | ester oil (12) | tricresyl phosphate (4) | calcium sulfonate (6) | yes | 0.4 | 12 | 1.0 ± 0.1 | 40 to 70 | M.B. 0.6 H.B. 0.5 | >20000 | O.K. |

TABLE 4

| Comparative Example | Lubricating oil | | | Impregnation of lube oil in cage | Amount of impregnation of lube oil in cage (% by weight) | Thickness of lube oil film on balls and inner and outer races (μm) | Turning torque and fluctuations in torque (gf.cm) | Dust generation (counts in 0.1 cf) | Bearing noise (Anderson value) | Endurance test (h) | Rust inhibition test |
|---|---|---|---|---|---|---|---|---|---|---|---|
| | base oil (mm²/s) | oiliness agent (% by weight) | rust inhibitor (% by weight) | | | | | | | | |
| 1 | ester oil (4) | tricresyl phosphate (4) | calcium sulfonate (6) | yes | 0.45 | 4 | 0.7 ± 0.1 | ca. 10 | M.B. 0.6 H.B. 0.5 | 9000 | O.K. |
| 2 | ester oil (160) | tricresyl phosphate (4) | calcium sulfonate (6) | yes | 0.25 | 4 | 1.4 ± 0.1 | ca. 10 | M.B. 0.6 H.B. 0.5 | ≧20000 | O.K. |
| 3 | ester oil (12) | none | calcium sulfonate (6) | yes | 0.4 | 4 | 0.8 ± 0.1 | ca. 10 | M.B. 0.6 H.B. 0.5 | 4000 | O.K. |
| 4 | ester oil (12) | tricresyl phosphate (12) | calcium sulfonate (6) | yes | 0.4 | 4 | 0.8 ± 0.1 | ca. 10 | M.B. 0.6 H.B. 0.5 | 9000 | rusted (slight) |
| 5 | ester oil (12) | tricresyl phosphate (4) | calcium sulfonate (1) | yes | 0.4 | 4 | 0.8 ± 0.1 | ca. 10 | M.B. 0.6 H.B. 0.5 | ≧20000 | rusted (moderate) |
| 6 | ester oil (12) | tricresyl phosphate (4) | calcium sulfonate (12) | yes | 0.4 | 4 | 0.8 ± 0.1 | ca. 10 | M.B. 0.6 H.B. 0.5 | 8000 | O.K. |
| 7 | ester oil (12) | tricresyl phosphate (4) | calcium sulfonate (6) | no | 0 | 4 | 0.8 ± 0.1 | ca. 10 | M.B. 0.6 H.B. 0.5 | 4500 | O.K. |
| 8 | ester oil (12) | tricresyl phosphate (4) | calcium sulfonate (6) | yes | 0.4 | 0 | 0.7 ± 0.3 | ca. 10 | M.B. 1.1 H.B. 1.0 | 12000 | rusted (extensive) |
| 9 | ester oil (12) | tricresyl phosphate (4) | calcium sulfonate (6) | yes | 0.4 | 22 | 1.3 ± 0.3 | 150 | M.B. 0.6 H.B. 0.5 | ≧20000 | O.K. |

The following five tests were conducted on the 31 test samples which were prepared in accordance with the specifications set forth in Tables 1 to 4.

Measuring the turning torque and fluctuations in torque (Test 1)

With one of the 31 cages built in, the ball bearing was applied with the pre-load of 2 kgf and the inner race was rotated at 3600 rpm to measure the torque required for its rotation and the fluctuations it experienced.

The results are shown in Tables 1 to 4; a sample passes the test if the torque is no more than 1.2 gf.cm and if the fluctuation in torque is no more than ±0.2 gf.cm.

Measuring the amount of dust generation (Test 2)

The amount of dust generation was determined by counting the number of dust particles that were generated during the performance of Test 1. The results are shown in Tables 1 to 4; the dust particles counted were those within a volume of 0.1 cf (cubic feet) which were not smaller than 0.1 μm in diameter and a sample passes the test if no more than 100 dust particles have been generated when counted after the passage of 1 hour.

Measuring the bearing noise (Test 3)

The sound that was heard as soon as Test 1 started was measured with an Andeton meter. The Andeton values thus obtained are shown in Tables 1 to 4. Andeton data consist of three types: values in the high-frequency band (H.B.); values in the medium-frequency band (M.B.); and values in the low-frequency band (L.B.); a sample passes the test if both values of H.B. and M.B. are unity and below. Values of L.B. are not listed in Tables 1 to 4 because the performance of a ball bearing is not greatly affected by L.B. data.

Endurance test (Test 4)

Test 1 was continued in a 60° C. atmosphere with a relative humidity of 5%, and the life of a sample was regarded to have expired when either one of the H.B. and M.B. data for Anderon value exceeded 3. The test was terminated in 20,000 hours; a sample passes the test if the life thus measured is at least 10,000 hours.

Rust inhibition test (Test 5)

The surfaces of the outer and inner races of each sample of miniaturized ball bearing were decreased thoroughly and, thereafter, the film of a lubricating oil was formed on those surfaces under the conditions set forth in Tables 1 to 4. Each sample was then left to stand in a test vessel for 7 days; after the passage of 7 days, the sample was visually checked for the presence of rust on the surface. The atmosphere in the test vessel was maintained at a relative humidity of 90% through the test which was conducted by changing the temperature continuously over the range from 20° to 50° C., with one cycle lasting for 3 hours. A sample passes the test if it is found to have developed no rust.

Figure 12:
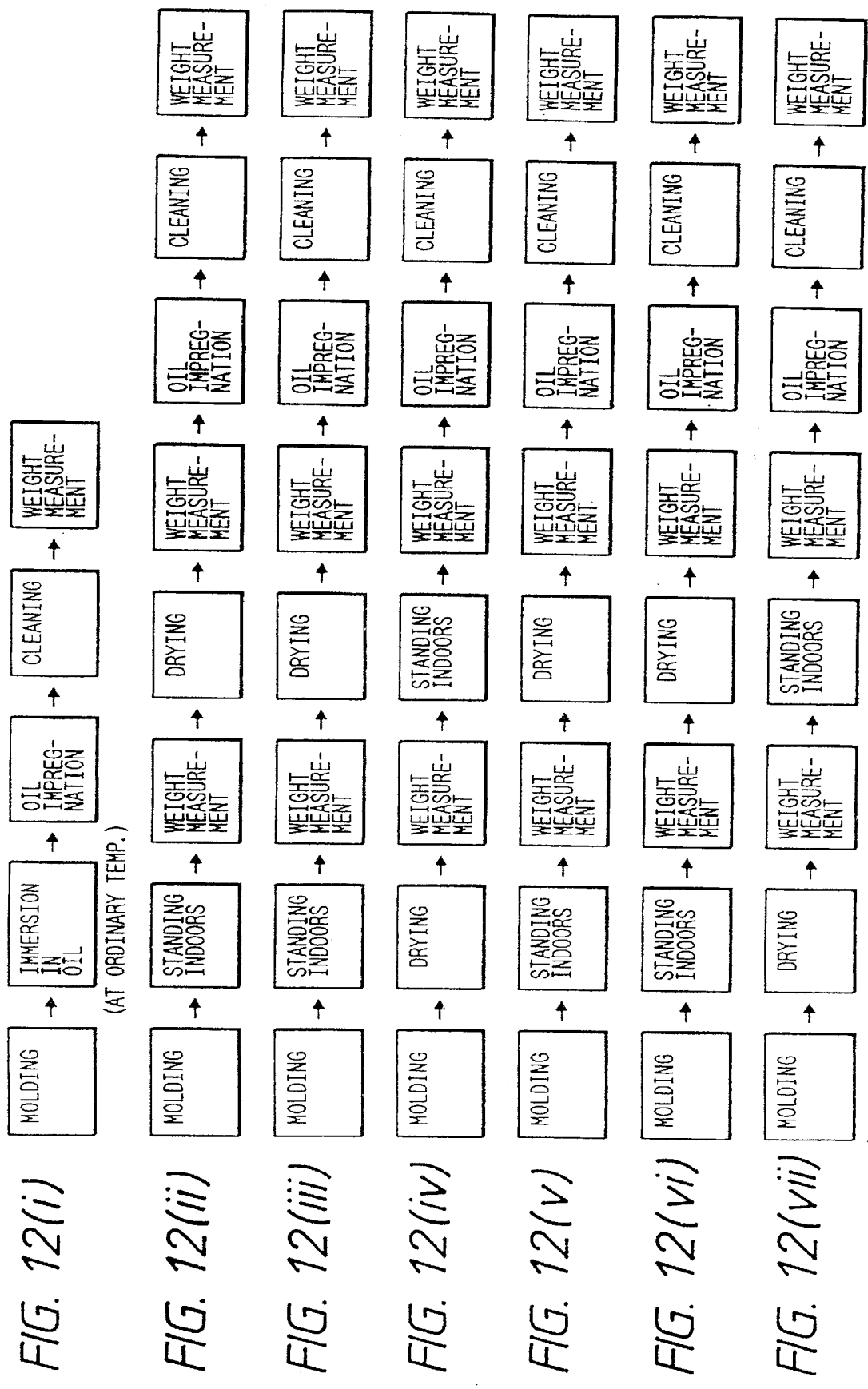

Moreover, with the ball bearing of the present invention, there is described below a method for producing the cage 7 made of the synthetic resin and impregnated with a specified amount of the lubricating oil, along with seven process examples (i) to (vii) in the method. FIGS. 12(i) to 12(vii) show processes of the method for producing the cage of the ball bearing corresponding to the seven process examples (i) to (vii). Table 5 shows contents of the processes. In Table 5, a step in the process indicated with "-" means that the step is the same as the process on the left side thereof, and a step in the process indicated with "-" means that the step is not performed.

TABLE 5

| Description | Process | | | | | | |
|---|---|---|---|---|---|---|---|
| | (i) | (ii) | (iii) | (iv) | (v) | (vi) | (vii) |
| Cage Material | crown-shaped polyamide resin | ← | ← | ← | ← | ← polyacetal resin | ← |
| Lubricating oil | ester-base synthetic oil, 10 mm²/s at 40° C. | ← | ← | ← | ← | ← | ← |
| Standing | — | 24 hours-standing in air at 25° C. 60% r.h | ← | ← | ← | ← | ← |
| Drying | — | 24 hours-standing in vacuum thermostatic chamber held at 65° C. and 10⁻¹ Torr | 3-hours standing in thermostatic chamber held at 120° C. | 24-hours standing in vacuum thermostatic chamber held at 65° C. and 10⁻¹ Torr | ← | ← | ← |
| Oil Impregnation | 5 hours immersion in oil with the temperature held at 80° C. (FIG. 13) | ← | ← | ← | 5 hours immersion in oil with the temperature held at 80° C. and the N₂ pressure in the oil bath held at 8 kgf/cm² (FIG. 14) | 5 hours immersion in oil with the temperature held at 80° C. (FIG. 13) | ← |

All of the seven process examples except the process example (i) involved a drying step which was performed to remove the moisture (water vapor) that entered the cage 7 as a result of standing in the air atmosphere after molding, thereby facilitating subsequent impregnation of the lubricating oil in the cage 7. In the process example (i), the cage 7 was immersed in an oil such as a lubricating oil just after molding and before any moisture would get into the cage; therefore, there is no need to perform the drying step.

The step of weight measurement was conducted to know the oil content, or the proportion in which the lubricating oil was impregnated in the cage 7. Therefore, when producing large quantities of the cage 7 in actual operations, there is no need to perform this weight measuring step for all units of the cage. The cleaning step was conducted after the oil impregnation step (for impregnating the lubricating oil in the cage 7) so as to remove the excess lubricating oil that adhered to the surface of the cage and to measure correctly the weight of the lubricating oil that was impregnated in the cage. The cleaning step can be omitted for actual products of the ball bearing.

Figure 13:
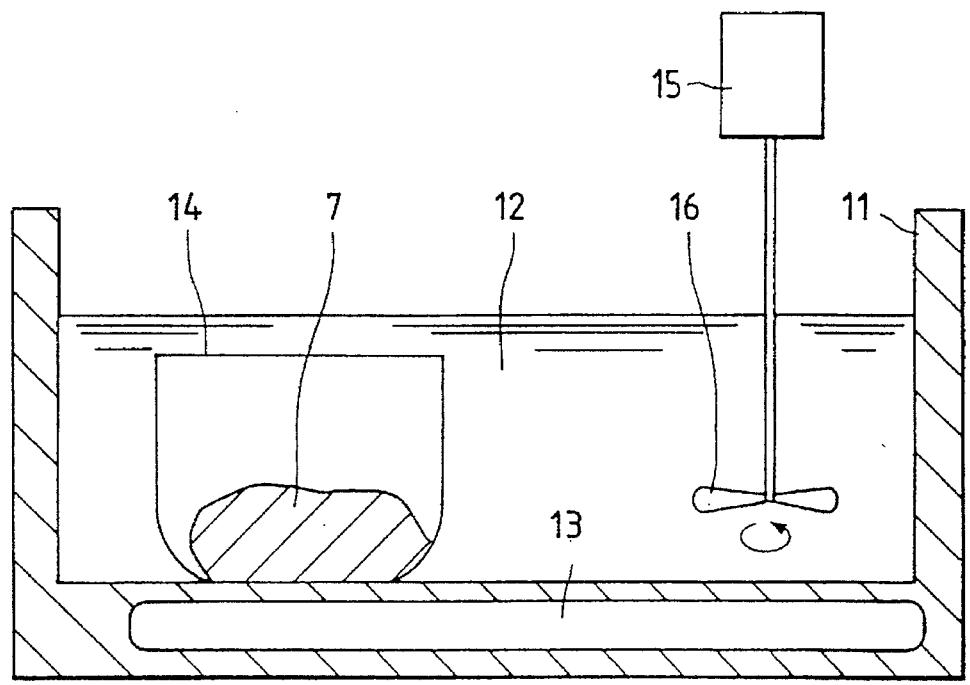
FIG. 13 is a longitudinal section of a first apparatus to be used for impregnating the cage with a lubricating oil.

The operation of impregnating the lubricating oil in the oil impregnation step was performed in the process examples (i) to (iv), (vi) and (vii) with an apparatus of the type shown in FIG. 13. The operation of oil impregnation was performed in the process example (v) with an apparatus of the type shown in FIG. 14.

To perform the operation of oil impregnation with the apparatus shown in FIG. 13, a lubricating oil 12 (ester base synthetic oil having a viscosity of 10 mm²/s at 40° C.) that was contained in an oil bath 11 with an open top was first heated to 80° C. with a heater 13. Then, a cage 7 that was put in a metal mesh basket 14 was immersed in the lubricating oil 12 for 5 hours. As long as the cage 7 was immersed in it, the lubricating oil 12 was kept stirred with agitating blades 16 that were driven with a motor 15.

Figure 14:
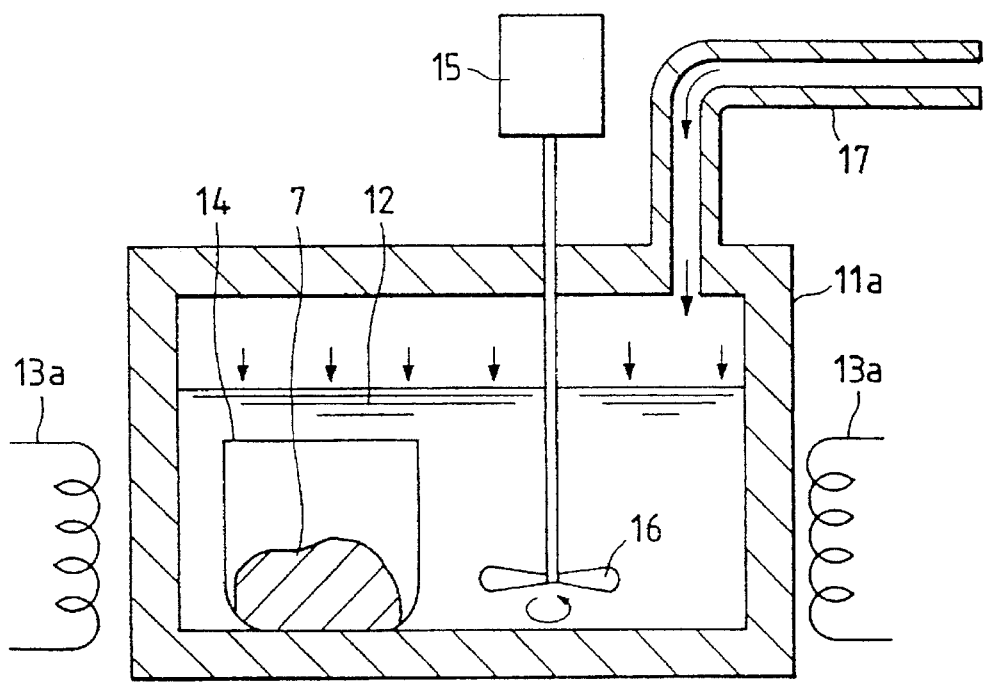
FIG. 14 is a longitudinal section of a second apparatus to be used for impregnating the cage with a lubricating oil.

To perform the operation of oil impregnation with the apparatus shown in FIG. 14, a lubricating oil 12 (ester base synthetic oil having a viscosity of 10 mm²/s at 40° C.) that was contained in an oil bath 11a as isolated from the external atmosphere was first heated to 80° C. with heaters 13a. Then, a cage 7 that was put in a metal mesh basket 14 was immersed in the lubricating oil 12 for 5 hours. As long as the cage 7 was immersed in it, the lubricating oil 12 was kept stirred with agitating blades 16 that were driven with a motor 15. The oil bath 11a was supplied with inert gas. Particularly, in the embodiment, the oil bath 11a was supplied with nitrogen gas (N₂) of high pressure (8 kgf/cm²) through a feed pipe 27, whereby the pressure in the oil bath 11a was maintained at 8 kgf/cm² as long as the cage 7 was immersed in the oil. If the gas that is supplied in the oil bath 11a is inert, the other kinds of gas may be used for maintaining the pressure in the oil bath 11a.

Using the apparatus shown in FIG. 13 or 14, the lubricating oil was impregnated in the synthetic resin cage 7 by the process examples (i) to (vii) which are identified in FIGS. 12(i) to 12(vii), and Table 5. As a result, the cage 7 was impregnated with the lubricating oil in the proportions (of oil content) set forth in Table 6 below. The oil content (% by weight) as noted in Table 6 is defined by the following formula:

$$\text{Oil content} = \frac{\text{(weight after the oil impregnation and cleaning steps)} - \text{(complete dry weight)}}{\text{complete dry weight}} \times 100$$

TABLE 6

| Process | Oil content (% by weight) |
|---|---|
| (i) | 0.48 |
| (ii) | 0.42 |
| (iii) | 0.41 |
| (iv) | 0.27 |
| (v) | 0.59 |
| (vi) | 0.62 |
| (vii) | 0.46 |

As shown in Table 6, the method of the present invention enables the synthetic resin cage 7 to be impregnated with a sufficient amount of lubricating oil to enhance the endurance of the ball bearing that has the cage 7 installed therein.

With the embodiments of the present invention, the cage 7 is made of the synthetic resin into the shape like the crown as shown in FIG. 3. However, without being limitted by the shape of the cage, the object of the present invention is similarly achieved by impregnating the cage with the lubricating oil having the viscosity of 10 to 150 mm$^2$/s at 40° C. when the cage 7 is molded with the synthetic resin. Further, the above-described impregnation step is performed for only the cage before the ball bearing is assembled. However, after the ball bearing is assembled, the whole of the ball bearing can be immersed in the lubricating oil. In the case, the impregnation step is not only effective for the cage, but also effective for any elements of component of the ball bearing. The more effectiveness of the present invention can be attained by impregnating the whole of the ball bearing with the lubricating oil.

Being thus constructed to operate in the manner described above, the ball bearing of the present invention insures reasonable endurance and yet reduces the necessary torque for rotation while causing less fluctuations in torque. It is also capable of reducing the amount of dust generation. According to the method of the present invention for producing the cage of a ball bearing, such improved ball bearing can be manufactured at low cost.

What is claimed is:

1. A method of producing a component of a ball bearing, comprising the steps of:

injection molding a synthetic resin into a predetermined shape to obtain said component; and immersing the component in a heated lubricating oil having a viscosity of 10 to 150 mm$^2$/s at 40° C. for impregnating the interior of said component with said lubricating oil.

2. The method of claim 1, further comprising the step of standing said mold at ordinary temperature after said molding step.

3. The method of claim 1, further comprising the step of drying said mold for removing the moisture entered into said cage from the air atmosphere after said molding step.

4. The method of claim 1, further comprising the step of removing an excess lubricating oil adhered to a surface of said mold.

5. The method of claim 1, wherein said immersing step is carried out by immersing said cage for 5 hours in said lubricating oil heated to 80° C. with a heater.

6. The method of claim 1, wherein said component is immersed in said lubricating oil contained in an oil bath supplied with inert gas.

7. The method of claim 6, wherein said inert gas comprises nitrogen gas (N$_2$), and said cage is immersed in said lubricating oil contained in said oil bath supplied with said nitrogen gas having a pressure of 8 kgf/cm$^2$.

8. The method of claim 1, wherein the lubricating oil contains at least one oil agent selected from the group consisting of phosphoric acid ester, fatty acid, higher alcohol, amine, organomolybdenum compound, and mixtures thereof in an amount of 0.5 to 10% by weight of the lubricating oil, and a rust inhibitor selected from the group consisting of calcium sulfonate, barium sulfonate and mixtures thereof in an amount of 2 to 10% by weight of the lubricating oil.

9. The method of claim 1, wherein said component is impregnated with the lubricating oil in an amount of 0.1 to 1.0% by weight of said mold.

10. The method of claim 1, wherein said component is one of an outer race, an inner race, a ball, and a cage of the ball bearing.

* * * * *